Patented July 10, 1945

2,380,115

UNITED STATES PATENT OFFICE 2,380,115

METHOD OF TREATING GUM SOLUTIONS

Herbert T. Leo, Clarence C. Taylor, and John W. Lindsey, Anaheim, Calif., assignors to Mutual Citrus Products Company, Anaheim, Calif., a corporation of California No Drawing. Application December 22, 1941, Serial No. 423,954

10 Claims. (Cl. 99—78)

This invention relates to a method of treating gums to render them compatible with pectin solutions, and, in particular, citrus beverages. The invention also pertains to gums so treated.

Pectin present in conventional citrus beverages serves as a clouding agent. If auxiliary clouding agents are added to citrus beverages, for instance, corn syrup, such auxiliary clouding agents will remain effective only as long as the pectin content of the citrus beverage is not precipitated out. All natural water soluble gums such as gum arabic, gum acacia, gum tragacanth, gum india and like gums suitable for use in cooking and confectionery for some heretofore unknown reason precipitate pectin from solution. Hence, when emulsions made with such gums are added to citrus beverages, the gums will precipitate the pectin and other clouding agents in the beverage.

It is, therefore, an important object of the present invention to provide a method of treating gums to eliminate their characteristic tendency to precipitate pectin, so that gums can be added to citrus beverages without causing precipitation of the clouding constituents thereof.

Other and further objects of this invention will become apparent from the following description and appended claims.

We have found that the precipitation of pectin by gums is due to the fact that the latter contain enzymes such as pectinase. We have further found that heating gum solutions destroys their enzyme content, thus rendering them compatible with pectin solutions, without destroying their emulsifying properties. Aqueous emulsions of citrus oil flavors can be prepared with thus heat-treated gum solutions which when added to citrus beverages do not cause the pectin or other clouding agents in the beverages to precipitate. We have further found that emulsions of citrus oil flavors prepared with thus heat-treated gum solutions do not turn rancid or acquire a turpentine-like taste on standing. In other words, they are not subject to oxidation on standing, as are emulsions prepared with untreated gums. We attribute this fact to a destruction of oxidizing enzymes, such as oxidase, during the course of the heat treatment.

The working of this invention will be described hereinbelow in connection with gum acacia. It should be understood, however, that the invention is applicable to the treatment of other gums, as stated hereinabove.

Gum acacia may suitably be heat-treated in solutions having the concentration at which the solution is to be used. Gum acacia emulsifies best at heavy concentrations. The emulsifying effect is not directly proportional to viscosity. We have found concentrations ranging from 20 to 40 per cent very effective. Other gums having greater viscosities at lesser concentrations are not as satisfactory as acacia solutions.

The time and temperature of heat treatment varies according to the pH value of the solution to be treated. Lowering the pH value ultimately effects destruction of the emulsifying properties of the gum when the gum is heated even at the minimum temperatures required for destruction of the enzymes. Time and temperature of heat treatment are therefore regulated to insure complete destruction of enzymes at the prevailing pH value which is kept high enough to avoid destruction of emulsifying properties. If the pH values are kept high a desirable prolonged heat treatment or a heat treatment at higher temperature can be used. If the pH values are low, the heat treatment must be less prolonged and at lower temperatures but the enzymes are more easily destroyed at these low pH values. Thus, the pH value and the time and temperature of the heat treatment are mutually dependent and can vary widely.

We have found, in particular, that heat treating acacia solutions of 20 to 40 per cent concentration and having a pH value of or near 5.00 for 15 minutes at 200° F. and then for 1 hour at about 170° F. but not higher than 200° F., will effect the destruction of all troublesome enzymes without materially lowering the emulsifying power of the gum. The desired pH may be effected by the addition of $\frac{1}{10}$ per cent of sodium benzoate followed by the addition of a suitable amount of a solution of an acid such as citric or tartaric acids. Such additions should precede the heat treatment and filtration.

The heat treated gum solutions are cooled rapidly, to prevent decomposition of acacia.

All gums akin to acacia are very dirty, and filtration is therefore necessary to prepare a good solution, although not necessary to destroy enzymes.

An illustrative example of the heat treatment of gum acacia is described hereinbelow.

Seventeen pounds of acacia gum is dissolved in 6 gallons hot water. Enough sodium benzoate is added to form a $\frac{1}{10}$ per cent solution. Enough citric or tartaric acid is added to bring the pH to 5.00 or very close to that pH value. The solution is then heated by any convenient means, without dilution, to 200° F., this temperature being maintained for 15 minutes. Eight pounds of calcined diatomaceous earth is then added for each 50 gallons of solution and the resulting mass is mixed thoroughly and pumped through a plate and frame or other suitable filter press. A temperature of 170° to 200° F. is maintained for one hour either before or after the filtration, after which the solution is cooled rapidly.

The filtered acacia solution may be used with excellent results in a formula such as the following:

| | |
|---|---|
| Oil of orange compound | 1040 cc. |
| Glucose (85% solids) | 25 pounds |
| Color | To suit |
| Treated acacia solution | 1 gallon plus 50 fluid ounces |
| 25% sodium benzoate solution | 2 fluid ounces |
| 50% citric acid solution | 1 fluid ounce |

This formula makes 4 gallons of emulsion. Any suitable emulsifying equipment may be used.

The sodium benzoate solution is made by dissolving two pounds of sodium benzoate in sufficient water to make one gallon.

The acid solution is made by dissolving four pounds of citric acid in enough water to make one gallon.

For best results, the pH of the emulsion is kept at about 3.50 to 3.75 and the total solids at approximately 60 per cent. Any color that does not react with the ingredients may be used.

The above described emulsion may be used as a flavoring and clouding agent for citrus beverages typified by the following formula:

| | | |
|---|---|---|
| 70° Brix concentrated orange juice | gallons | 6 |
| Orange emulsion | do | 3 |
| 50% citric acid solution | fluid ounces | 200 |
| 25% sodium benzoate solution | gallons | ¾ |
| 32° Baumé sugar syrup | do | 88 |

This formula makes 100 gallons throwing syrup of such strength that 2 fluid ounces in 12 fluid ounces of beverage makes an excellent quality beverage having the appearance of orange juice. In making beverages from this throwing syrup, 2 fluid ounces of syrup are placed in a 12 fluid ounce bottle and either plain or carbonated water is added.

Many variations can be made. The sodium benzoate is added to stop bacterial growth, not to inhibit the action of enzymes. If a beverage is pasteurized, the sodium benzoate may be omitted.

Gum acacia solutions may be used that contain up to 3 pounds of gum per gallon.

Emulsions containing the heat treated gum solutions of this invention are particularly adapted for use in citrus juice syrups to be spray dried according to the methods disclosed in the copending application of Herbert T. Leo and Clarence C. Taylor entitled "Citrus juice powder and method of making the same." The short heat treatment connected with the spray drying of citrus fruit juices is not sufficient to destroy the gum enzymes.

Other gums than the preferred acacia will make satisfactory emulsions after heat treatment, although the acacia emulsions are distinguished by smaller oil droplets and keep better. Other gums than acacia must be treated differently. Gum tragacanth, for instance, can not be filtered, since filtration removes a valuable swelling component of the gum. Gum tragacanth and related gums therefore form solutions containing grit and sand. Further, gum tragacanth solutions will contain a maximum of only 2½ to 3 ounces of gum per gallon, and such solutions, although requiring a heat treatment like that of gum acacia solutions to kill the enzymes, will suffer a greater loss in emulsifying power during heat treatment.

Many details of procedure and composition may be varied within a wide range without departing from the principles of this invention and it is, therefore, not our intention to limit the patent granted on this invention otherwise than necessitated by the scope of the appended claims.

We claim as our invention:

1. A method of treating an aqueous gum acacia solution to render the same compatible with pectin solutions comprising manitaining the pH value of said solution at about 5, heating said solution for 15 minutes at 200° F. and for one hour at 170° to 200° F. and immediately thereafter cooling said solution.

2. A method of treating an aqueous gum acacia solution to render the same compatible with citrus beverages comprising heating said solution 170° to 200° F. long enough to destroy completely pectin enzymes present therein while maintaining the pH value of said solution at about 5 to preserve the emulsifying power thereof.

3. A method of preparing a stable aqueous solution of a natural water soluble gum and pectin which comprises heating an aqueous solution of said gum at 170° to 200° F. for a time sufficient to destroy enzymes present therein and thereafter incorporating pectin therewith.

4. The method of preparing a stable aqueous solution of a natural water soluble gum and pectin which comprises dissolving said gum in water and heating the resulting solution at a temperature of from 170° to 200° F. and for a time sufficient to destroy enzymes present therein while maintaining the pH value of the solution high enough to avoid destruction of the emulsifying properties of said gum and thereafter incorporating pectin with said solution.

5. The method of preparing a stable aqueous solution of a natural water soluble gum and pectin which comprises dissolving the gum in water and heating the resulting solution at a temperature of from 170° to 200° F. and for a time sufficient to destroy enzymes present therein while maintaining the pH value of the solution at about 5 to avoid destruction of the emulsifying properties of said gum, then cooling the solution, and incorporating the pectin with the heated solution.

6. A method of treating an aqueous solution of a natural gum to render the same compatible with citrus beverages comprising heating said solution at 170° to 200° F. long enough to destroy completely pectin enzymes present therein while maintaining the pH value of said solution at about 5 to preserve the emulsifying power thereof.

7. A method of treating an aqueous gum tragacanth solution to render the same compatible with citrus beverages comprising heating said solution at 170° to 200° F. long enough to destroy completely pectin enzymes present therein while maintaining the pH value of said solution at about 5 to preserve the emulsifying power thereof.

8. The method of preparing a stable aqueous solution of gum tragacanth and pectin which comprises dissolving said gum in water and heating the resulting solution at a temperature of from 170° to 200° F. and for a time sufficient to destroy enzymes present therein while maintaining the pH value of the solution high enough to avoid destruction of the emulsifying properties of said gum and thereafter incorporating pectin with said solution.

9. A method of preparing a stable aqueous solution of gum acacia and pectin which comprises heating an aqueous solution of said gum at 170° to 200° F. for a time sufficient to destroy enzymes present therein and thereafter incorporating pectin therewith.

10. A method of preparing an aqueous gum acacia solution compatible with pectin solutions comprising dissolving said gum in water to form a 20% to 40% solution and heating said solution at 170° to 200° F. long enough to destroy completely pectin enzymes present therein while maintaining the pH value of said solution at about 5 to preserve the emulsifying power thereof.

HERBERT T. LEO.
CLARENCE C. TAYLOR.
JOHN W. LINDSEY.